(12) United States Patent
Yoshino et al.

(10) Patent No.: US 9,731,547 B2
(45) Date of Patent: *Aug. 15, 2017

(54) FRICTIONAL PROPULSION DEVICE AND OMNI-DIRECTIONAL VEHICLE

(71) Applicant: HONDA MOTOR CO., LTD., Minato-ku, Tokyo (JP)

(72) Inventors: Tsutomu Yoshino, Wako (JP); Wataru Yada, Wako (JP); Jun Inada, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/098,880

(22) Filed: Apr. 14, 2016

(65) Prior Publication Data

US 2016/0303899 A1    Oct. 20, 2016

(30) Foreign Application Priority Data

Apr. 16, 2015    (JP) .................................. 2015-084168

(51) Int. Cl.
| | |
|---|---|
| *B60B 19/12* | (2006.01) |
| *B60B 19/00* | (2006.01) |
| *B60B 27/00* | (2006.01) |
| *B62K 1/00* | (2006.01) |
| *B62D 21/02* | (2006.01) |
| *B62K 11/00* | (2006.01) |

(52) U.S. Cl.
CPC ............ *B60B 19/003* (2013.01); *B60B 19/12* (2013.01); *B60B 27/0005* (2013.01); *B62D 21/02* (2013.01); *B62K 1/00* (2013.01); *B62K 11/007* (2016.11)

(58) Field of Classification Search
CPC ..... B60B 19/003; B60B 19/12; B60B 19/125; B62K 11/007; B62K 1/00; B62D 21/02
See application file for complete search history.

(56) References Cited

U.S. PATENT DOCUMENTS

| 8,220,571 B2 | 7/2012 | Gomi et al. | |
|---|---|---|---|
| 8,567,535 B2 * | 10/2013 | Takenaka ................. | B62K 1/00 180/21 |
| 2011/0070997 A1 * | 3/2011 | Gomi ....................... | B60B 9/06 476/66 |

(Continued)

FOREIGN PATENT DOCUMENTS

| JP | 2011-063209 A | 3/2011 |
|---|---|---|
| JP | 2011-063252 A | 3/2011 |

*Primary Examiner* — Drew J Brown
(74) *Attorney, Agent, or Firm* — Carrier Blackman & Associates, P.C.; Joseph P. Carrier; Anne G. Sabourin

(57) ABSTRACT

In a frictional propulsion device comprising a main wheel including driven rollers rotatably supported by an annular core member about a tangential direction and a pair of drive disks each carrying a plurality of drive rollers rotatable about a rotational center line at an angle with respect to both a tangential line of the drive disk and the rotational center line of the drive disk such that the drive rollers at least partly engage the driven rollers, a diameter of a drive side contact circle is smaller than a diameter of a driven side contact circle, and the drive disks are vertically offset relative to the main wheel so that only those drive rollers adjoining the main wheel are in contact with the driven rollers.

10 Claims, 6 Drawing Sheets

(56) References Cited

U.S. PATENT DOCUMENTS

| | | | |
|---|---|---|---|
| 2012/0032496 A1* | 2/2012 | Takenaka | B60B 19/003 301/5.23 |
| 2014/0353051 A1* | 12/2014 | Yada | B62K 11/007 180/6.2 |
| 2015/0129327 A1* | 5/2015 | Yoshino | B60B 19/003 180/6.5 |
| 2016/0304163 A1* | 10/2016 | Yoshino | B60B 19/003 |

* cited by examiner

FRICTIONAL PROPULSION DEVICE AND OMNI-DIRECTIONAL VEHICLE

TECHNICAL FIELD

The present invention relates to a frictional propulsion device and an omni-directional vehicle, and in particular to a frictional propulsion device that can be favorably used in an omni-directional vehicle and an omni-directional vehicle equipped with such a frictional propulsion device.

BACKGROUND ART

A known frictional propulsion device for an omni-directional vehicle comprises a main wheel including an annular core member and a plurality of driven rollers (free rollers) fitted on the annular core such that each driven roller may be freely rotatable around the tangential direction of the annular core member at the corresponding position, and a pair of drive disks provided on either side of the main wheel each including a disk member and a plurality of drive rollers (free rollers) arranged along the outer periphery of the disk member and engaging the driven rollers of the main wheel so as to be each rotatable around a rotational center line at an angle to both the lateral direction and the radial direction. See JP2011-63209A and JP2011-63252A, for instance.

In the disclosed frictional propulsion devices, the drive disks are rotatably supported by the body frame of the omni-directional vehicle so that the driven rollers are interposed between the drive rollers from either side, and the lower most driven rollers of the main wheel contact the road surface.

In such a frictional propulsion device, only the driven rollers located in the lower most part of the main wheel contribute to the propulsion of the omni-directional vehicle while the remaining driven rollers rotate idly around the core member without contributing to the propulsion of the vehicle.

In the structure disclosed in JP2011-63209A, the drive disks and the main wheel are arranged concentrically so that the drive side contact circle defined by the points on the drive disk at which the drive rollers contact the driven rollers is equal in diameter to the driven side contact circle defined by the points on the main wheel at which the driven rollers contact the drive rollers. Therefore, a large part of the driven rollers rotate without contributing to the propulsion of the vehicle so that a significant power loss is caused. Also, as these contact circles are identical to each other in diameter, about the same number of drive rollers as the driven wheels on the main wheel are required to be provided on each drive disk. The main wheel is required to have a relatively large diameter in view of achieving the desired terrain traversability of the main wheel, and this in turn causes an increase in the number of drive rollers. The need for a large number of drive rollers causes an increase in the manufacturing cost and an increase in the weight.

In the structure disclosed in JP2011-63252A, the central axial line of each drive disk is tilted with respect to the central axial line of the main wheel so that only those drive rollers located in a lower most part engage the driven rollers, and the number of drive rollers that are idly driven can be reduced. However, as the drive side contact circle and the driven side contact circle are still identical in diameter to each other, a relatively large number of drive rollers are required in proportion to the size of the main wheel, and this causes an increase in the manufacturing cost and an increase in the weight.

BRIEF SUMMARY OF THE INVENTION

In view of such problems of the prior art, a primary object of the present invention is to provide a frictional propulsion device that can minimize power loss.

A second object of the present invention is to provide a frictional propulsion device that can minimize the manufacturing cost and the weight of the device.

A third object of the present invention is to provide an omni-directional vehicle equipped with such a frictional propulsion device.

To achieve such objects, the present invention provides a frictional propulsion device, comprising: a frame (10); a main wheel (30) including an annular core member (32) having a laterally extending central axial center line (B) and a plurality of driven rollers (60) each rotatably supported on the annular core member about a tangential line of the annular core member; a support shaft (22) supported by the frame and extending laterally across a hollow interior of the main wheel; a pair of drive disks (70) rotatably supported by the support shaft on either side of the main wheel, the drive disks being individually rotatable around a central axial line (A) common to the support shaft; and a plurality of drive rollers (78) arranged along a peripheral part of each drive disk and each rotatably supported by the drive disk about a rotational center line at an angle with respect to both a tangential line of the drive disk and the rotational center line of the drive disk, at least part of the drive rollers engaging the driven rollers of the main wheel; wherein a diameter (D1) of a drive side contact circle defined by points on the drive disk at which the drive rollers contact the driven rollers is smaller than a diameter (D2) of a driven side contact circle defined by the points on the main wheel at which the driven rollers contact the drive rollers (D1<D2), and the drive disks are vertically offset relative to the main wheel so that only those drive rollers adjoining the main wheel are in contact with the driven rollers.

According to this arrangement, as opposed to the case where D1=D2, the number of the drive rollers can be reduced so that the number of component parts, the manufacturing cost and the weight of the device can be reduced. Furthermore, by avoiding the idle driving of the driven roller not in contact with the road surface, power efficiency can be improved.

Preferably, the central axial line (A) of the support shaft (22) and a central axial line (B) of the main wheel (30) are parallel to each other, and imaginary planes containing the drive side contact circle and the driven side contact circle are parallel to each other.

Thereby, the two drive disks are not tilted so that the lateral expanse of the frictional propulsion device can be reduced as compared to the case where the imaginary planes containing the contact circles are tilted.

The frictional propulsion device may further comprise a guide member (100, 102, 103; 106, 108, 110) supported by the frame for engaging the driven rollers that are not in contact with the drive rollers against yaw and/or roll movement of the main wheel relative to the frame.

A large part of the driven rollers that are not in contact with the drive rollers are not retained by the drive rollers, but the guide member maintains the main wheel in the prescribed upright position in a stable manner For instance, the guide member may include a plurality of guide members that engage the driven rollers located in a plurality of circumferentially separated parts of the main wheel.

Thereby, the main wheel may be favorably restricted from undergoing unintended roll or yaw movement. The guide members typically consist of free rollers (102, 110) each configured to make a rolling contact with the driven rollers on the main wheel.

According to a preferred embodiment of the present invention, the guide member includes at least a pair of rollers (102) each having a central axial line in parallel with a central axial line of the main wheel and engaging an inner peripheral part of the main wheel.

Thereby, the yaw movement of the main wheel can be effectively prevented.

According to another preferred embodiment of the present invention, the guide member includes an hourglass shaped roller (102) having a central axial line in parallel with a central axial line of the main wheel and engaging an inner peripheral part of the main wheel.

Thereby, the roll movement of the main wheel can be effectively prevented.

According to yet another embodiment of the present invention, the guide member includes an arm (106) rotatably supported by the support shaft or the frame around the central axial line of the support shaft and at least one free roller (110) supported by the arm and making a rolling contact with the driven rollers on the main wheel.

According to this arrangement, the guide member can be fitted into the lower part of the hollow interior of the main wheel so that a substantial space is created in the upper part of the hollow interior of the main wheel that can accommodate various equipment of the device such as the electric motors and the reduction gear system. Thereby, a high space efficiency can be achieved while ensuring a favorable guiding action for the main wheel.

Preferably, the arm extends away from the central axial line of the support shaft in two opposite directions, and the at least one free roller is provided on each terminal end of the arm.

Thereby, the yaw movement and the roll movement of the main wheel can be favorably prevented.

The present invention further provides an omni-directional vehicle, comprising: the frictional propulsion device defined above; and a drive unit supported by the frame and configured to rotationally drive the two drive disks individually.

Thus, the present invention provides a frictional propulsion device that can minimize power loss while minimizing the manufacturing cost and the weight of the device.

DESCRIPTION OF THE PREFERRED EMBODIMENT(S)

A preferred embodiment of the present invention is described in the following with reference to FIGS. 1 to 5.

Figure 1:
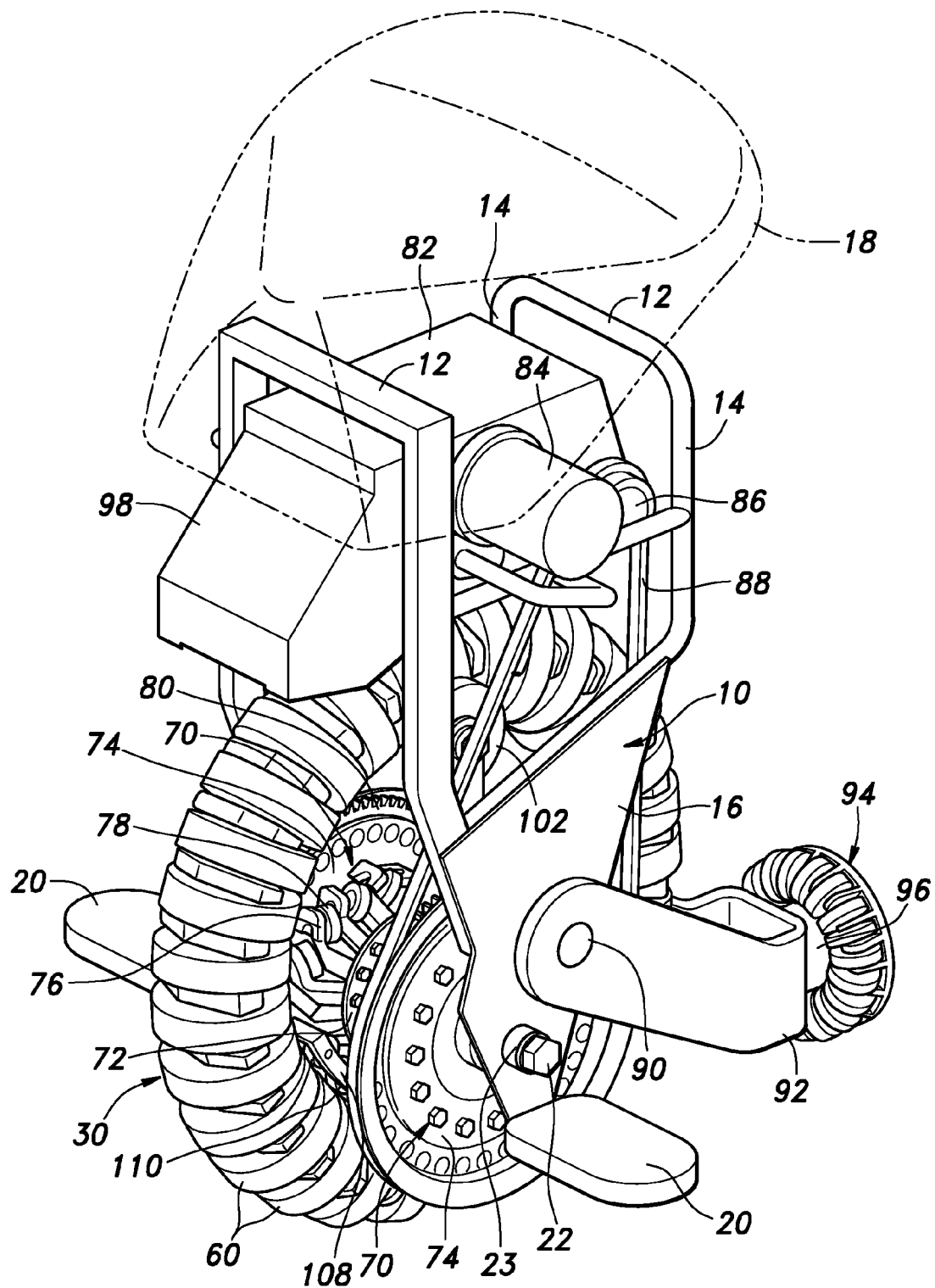
FIG. 1 is a perspective view of an omni-directional vehicle of an inverted pendulum type using a frictional propulsion device according to the present invention.

As shown in FIG. 1, the inverted pendulum vehicle of the illustrated embodiment (omni-directional vehicle) comprises a vehicle body frame 10. The vehicle body frame 10 comprises a pair of upper cross members 12, and a pair of side leg members 14 each having a pair of bifurcated upper parts connected to the lateral ends of the corresponding cross members 12, respectively, and a lower part connected to a triangular lower support plate 16 extending along either side of the vehicle. The upper cross members 12 support a saddle 18 for seating the rider, and each lower support plate 16 is fitted with a foot rest 20 for supporting the corresponding foot of the rider.

A main wheel 30 and a pair of drive disks 70 flanking the main wheel 30 are disposed between the lower parts of the two leg members 14 or the lower support plates 16.

Figure 2:
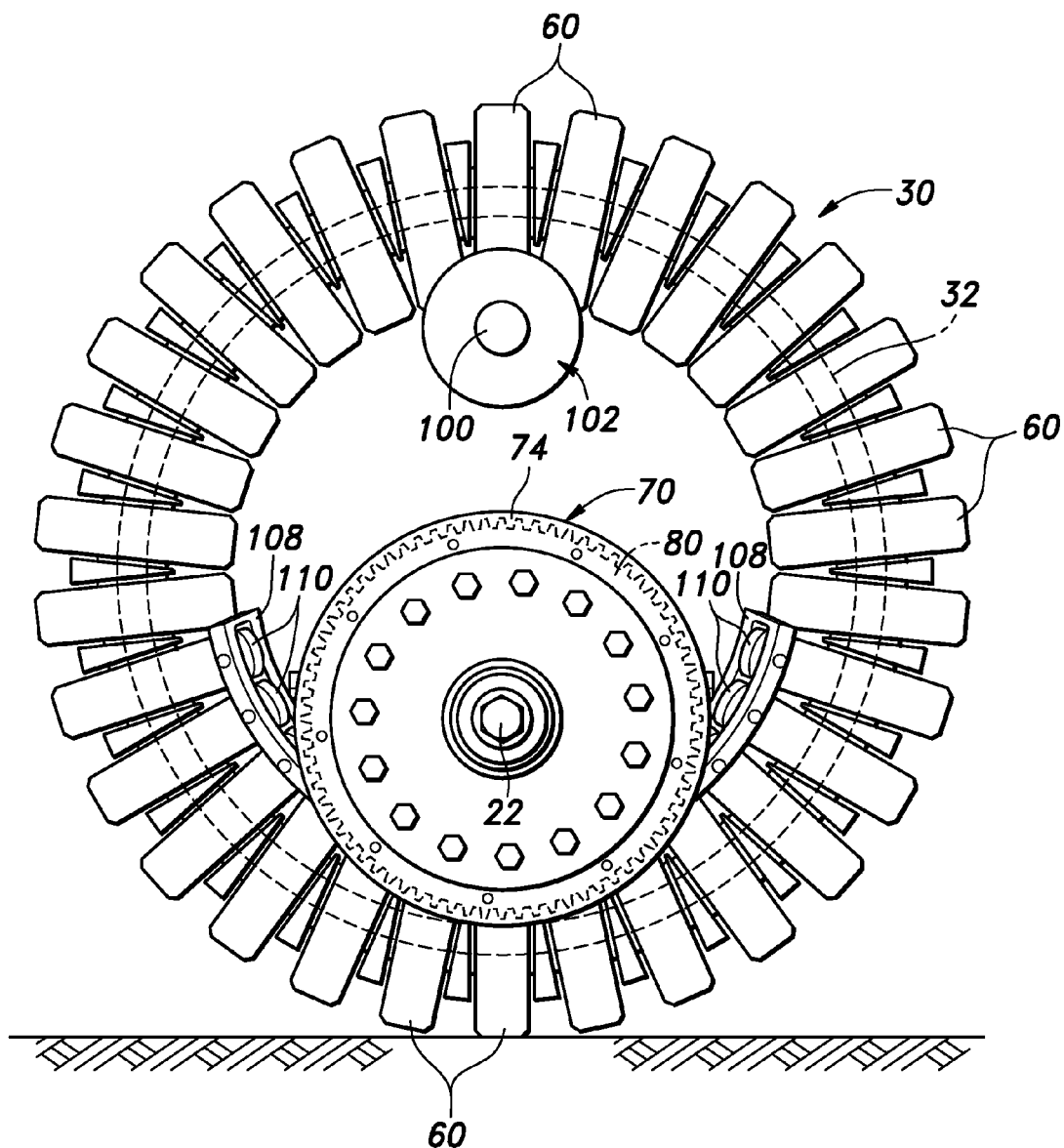
FIG. 2 is a side view of the frictional propulsion device.
Figure 3:
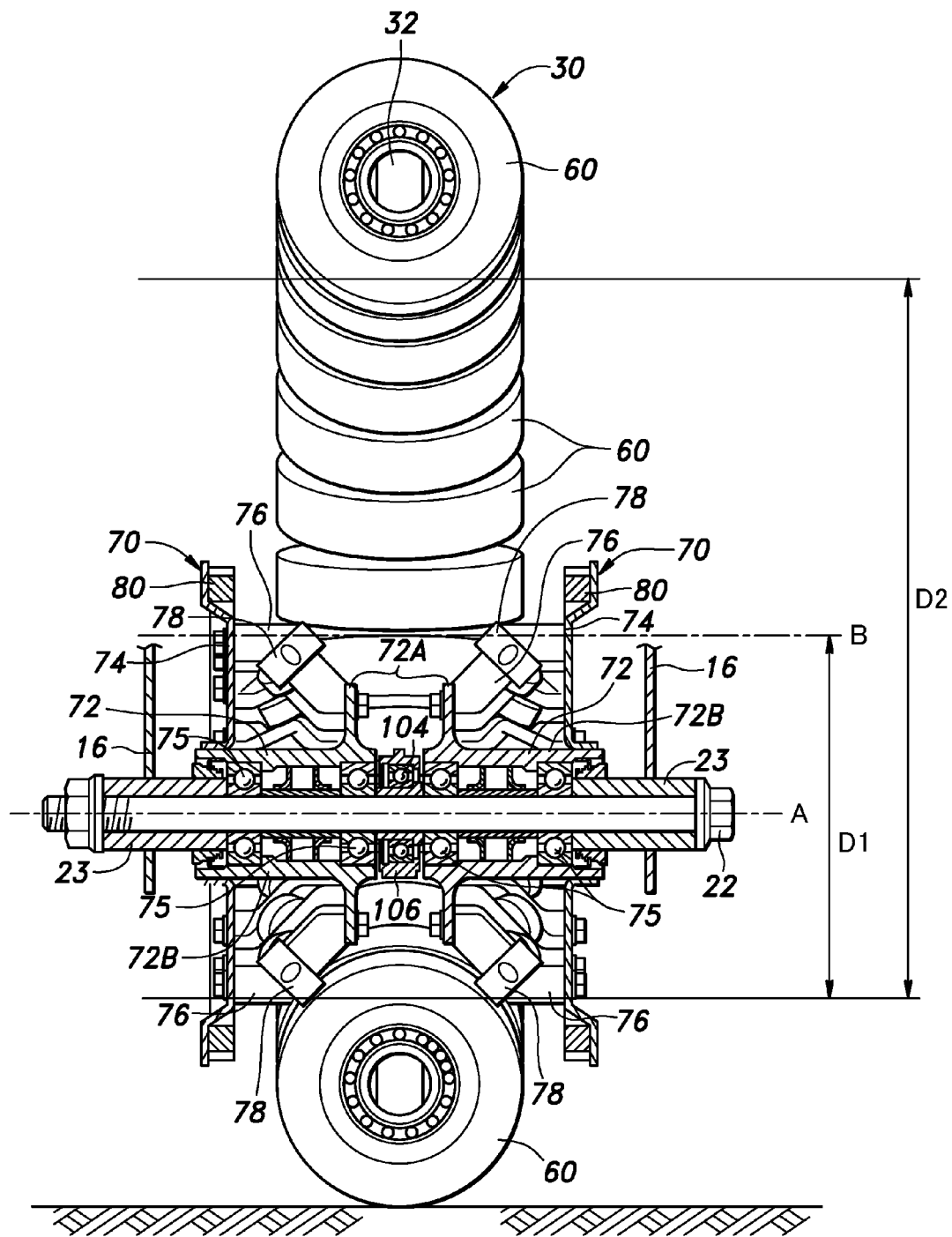
FIG. 3 is a sectional front view of the frictional propulsion device.
Figure 4:
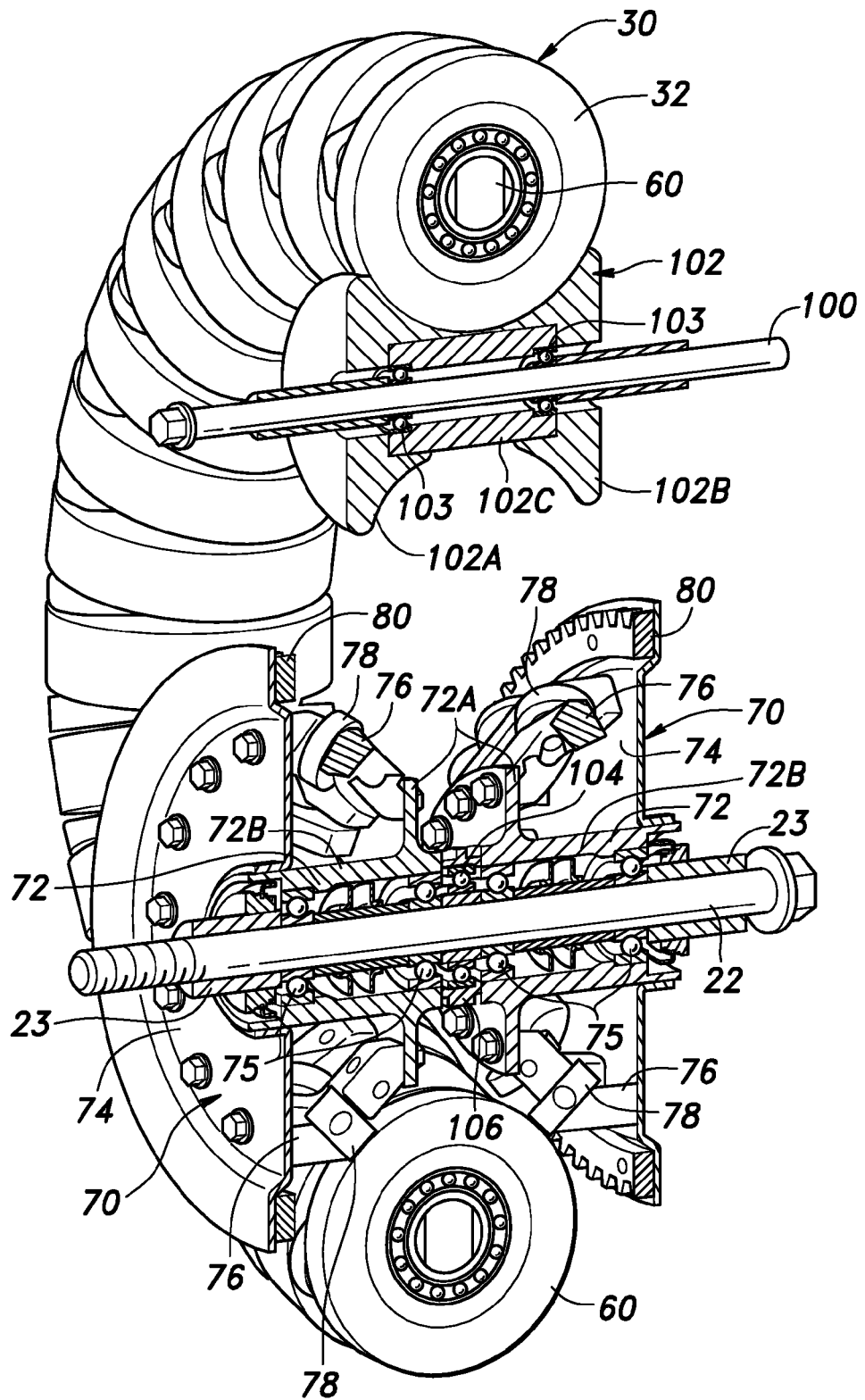
FIG. 4 is a sectional perspective view of the frictional propulsion device.
Figure 5:
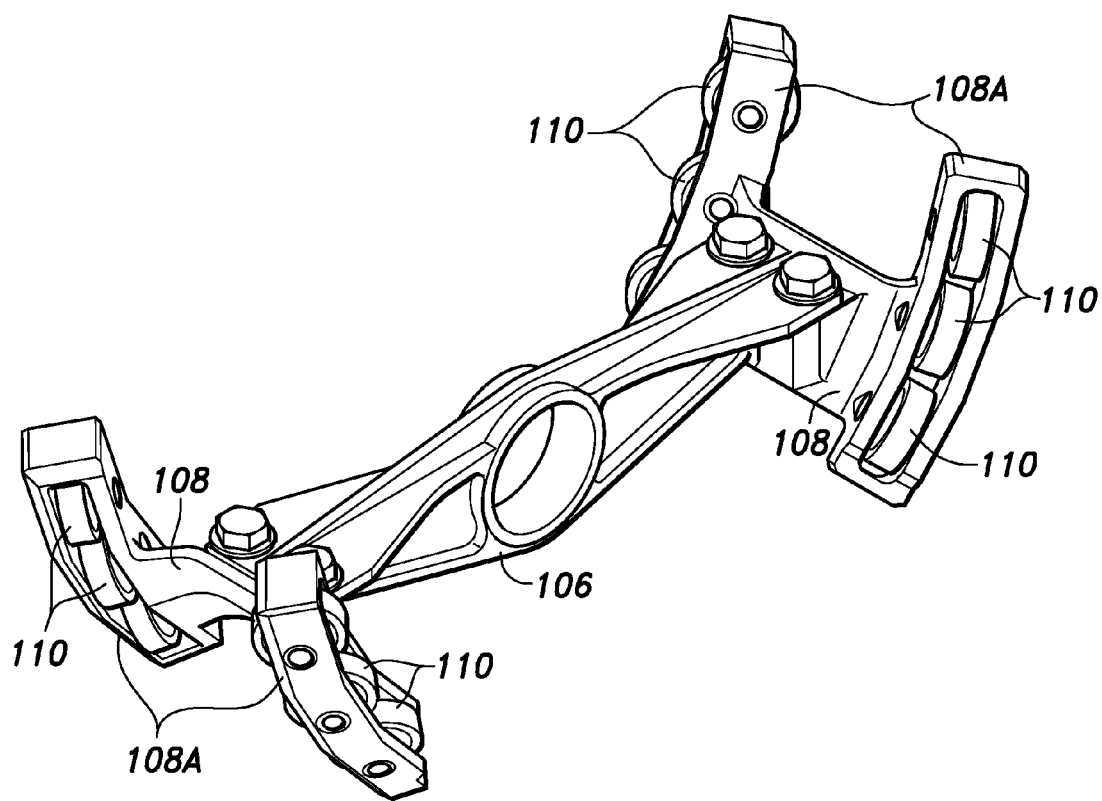
FIG. 5 is a perspective view of an arm and free rollers used for stabilizing the main wheel of the frictional propulsion device.

As shown in FIGS. 2 to 4, the main wheel 30 includes an annular core member 32 having a central axial line extending laterally (horizontally) and a plurality of driven rollers (free rollers) 60 fitted on the annular core member 32 like beads of a rosary. Each driven roller 60 is rotatable around the tangential line of the annular core member 32 at the point where the particular driven roller 60 is located.

As shown in FIGS. 3 and 4, the two drive disks 70 are symmetric to each other about the central major plane of the main wheel 30, and are each provided with a hub 72 and a disk member 74 connected coaxially and outboard to the hub 72. Each hub 72 includes a cylindrical part 72B and a radial flange 72A extending radially outward from the part of the cylindrical part 72B adjoining the inboard end thereof. A pair of such hubs 72 are arranged symmetric to each other about the main wheel 30, and are each configured similar to the hub of a motorcycle. A plurality of drive roller holders 76 are provided between the radial flange 72A of the hub 72 and the outer peripheral part of the disk member 74, and are arranged along a circle concentric to the support shaft 22. A drive roller (free roller) 78 is rotatably supported between each pair of adjoining holders 76 around a rotational center line which is at an angle to both the radial direction and the lateral direction.

Each lower support plate 16 is fixedly fitted with a sleeve 23 which in turn fixedly supports the corresponding end of the support shaft 22. The support shaft 22 is passed though the hollow interior of the two hubs 72, and support the hubs 72 individually via ball bearings 75, respectively. In other words, the body frame 10 supports the two hubs 72 and hence the drive disks 70 in a rotatable manner around the common central axial line A. This central axial line A is in parallel with the central axial line B of the main wheel 30.

Here, an imaginary circle defined by the points on the drive disk 70 at which the drive rollers 78 contact the driven rollers 60 is called as a drive side contact circle, and an imaginary circle defined by the points on the main wheel 30 at which the driven rollers 60 contact the drive rollers 78 is called as a driven side contact circle.

In the illustrated embodiment, the diameter D1 of the drive side contact circle is smaller than the diameter D2 of the driven side contact circle. Also, as the drive disks 70 are supported by the common support shaft 22 extending laterally (horizontally), the plane of the drive side contact circle is in parallel with the plane of the driven side contact circle.

Because D1<D2, the drive disks 70 are radially (vertically) offset from the main wheel 30 so that only those drive rollers 78 adjoining the driven rollers 60 are in contact with the driven rollers 60. In other words, as the central axial line A of the drive disks 70 is downwardly offset relative to the central axial line B of the main wheel 30, only those drive rollers 78 which are located in a lower part of the drive disks 70 engage those driven rollers 60 located in a lower part of the main wheel 30. In this case, the drive rollers 78 and the driven rollers 60 are disposed in a symmetric relationship about a vertical line passing through the road contact point of the main wheel 30 when viewed from sideways. This is advantageous because only those driven rollers 60 engaging the road surface are effective in propelling the vehicle, and only those drive rollers 78 effective in driving the driven rollers 60 engaging the road surface are required to be driven while the remaining drive rollers 78 not contributing to the propulsion of the vehicle are left idle without consuming any energy.

The drive rollers 78 engaging the driven rollers 60 of the main wheel 30 are urged downward or against the driven rollers 60 under the weight of the vehicle and the rider seated on the saddle 18. Typically, one or two of the driven rollers 60 of the main wheel 30 engage the road surface, but when the loading is great, three or more of the driven rollers 60 may engage the road surface owing to the elastic deformation of the driven rollers 60.

As shown in FIGS. 2 and 4, the body frame 10 is provided with an upper shaft 100 which extends laterally through the main wheel 30 in an upper part thereof and supports an hourglass shaped idler roller 102 via a pair of ball bearings 103. The idler roller 102 includes a pair of frusto-conical end members 102A and 102B opposing each other with the narrower ends thereof and a cylindrical part 102C coaxially connecting the narrower ends of the frusto-conical end members 102A and 102B with other so as to define the hourglass shape. The narrow intermediate part of the idler roller 102 engages the upper part of the inner periphery of the main wheel 30. Thereby, the main wheel 30 is restrained against a roll movement thereof or prevented from tilting sideways. The driven rollers 60 engaged by the idler roller 102 are idle so that substantially no frictional resistance is caused by the idler roller 102.

If desired, a biasing spring (not shown in the drawings) may be provided on the body frame 10 so that the idler roller 102 may be resiliently urged against the driven rollers 60 in the uppermost part of the main wheel 30.

As shown in FIGS. 3 and 4, the central part of the support shaft 22 rotatably supports a middle part of an arm 106 via a ball bearing 104, between the opposing ends of the cylindrical parts 72B of the two hubs 72. The arm 106 extends in the both forward and rearward directions from the central part thereof, and the forward and rearward ends of the arm 106 are each bifurcated into a pair of arcuate arm ends extending in the longitudinal direction on either side of the central plane of the main wheel 30. Each arm end is provided with a roller holder 108 that holds a plurality of free rollers (guide rollers) 110 disposed in tandem to one another and engaging the inner periphery of the main wheel 30. Thus, two rows of free rollers 110 are arranged along the inner periphery of the main wheel 30 and engage the inner periphery of the main wheel 30. In particular, the free rollers 110 engage those driven rollers 60 that are idle, and are located adjacent to the driven rollers 60 that are engaged by the drive rollers 78 and engaging the road surface.

The main wheel 30 is thus supported by the two sets of drive rollers 78 and the free rollers 110 at the lower part thereof on either side against lateral and yaw movements and by the idler roller 102 at the upper end thereof against lateral movement so that the main wheel 30 can be maintained in the upright attitude without wobbling either in the lateral direction, in the roll direction or in the yaw direction. Furthermore, when the body frame 10 is lifted off the ground, the idler roller 102 prevents the main wheel 30 from sagging down from the body frame 10.

A driven pulley 80 is coaxially attached to the inner side of each disk member 74. The driven pulley 80 in this case consists of a toothed pulley, but may also consist of a regular V-pulley, flat pulley or a sprocket wheel. A gear box 82 is mounted in an upper part of the body frame 10, and a pair of electric motors 84 (only one of them is visible in FIG. 1) are attached to either side wall of the gear box 82 with the output shaft of each electric motor 84 extending in the inboard direction. The gear box 82 accommodates a reduction gear unit (not shown in the drawings) therein, and a pair of output shafts extend from either side of the gear box 82 in the outboard direction behind the electric motors 84, and each output shaft is fitted with a drive pulley 86. The rotation of each electric motor 84 is reduced in speed by the reduction gear unit, and is transmitted to the corresponding drive pulley 86. An endless cogged belt 88 is passed around each drive pulley 86 and the corresponding driven pulley 80 in a torque transmitting relationship so that the two drive disks 70 may be individually and rotatively actuated by the respective electric motors 84.

As shown in FIG. 1, a tail wheel arm 92 consisting of a bifurcated yoke member is pivotally supported by the lower support plates 16 at the bifurcated base ends via a pivot shaft 90 thereof extending laterally so that the tail wheel arm 92 may be tilted vertically about the base end thereof. The rear end or the free end of the tail wheel arm 92 supports a tail wheel 94 consisting of an omni wheel in a rotatable manner around a rotational center line extending in the fore and aft direction. An electric motor 96 is provided between the rear end of the tail wheel arm 92 and the tail wheel 94 to allow the tail wheel 94 to be selectively rotated about the rotational center line thereof. By thus actuating the electric motor 96, the vehicle may be steered in any desired direction. The tail wheel 94 includes a plurality of free rollers arranged around the periphery thereof, each free roller being rotatable around a rotational center line tangential to the periphery of the tail wheel 94 so that the tail wheel 94 may be dragged in the fore and aft direction without friction owing to the rotation of the individual free rollers engaging the road surface.

An electric box 98 accommodating electronic units such as an electronic control unit, a gyro sensor and motor drive unit is attached to the front end of the gear box 82. The electronic control unit controls the two electric motors 84 for the drive disks 70 to maintain the vehicle in an upright posture by executing a control process based on inverted pendulum control, and the electric motor 96 for the tail wheel 94 for the turning movement of the vehicle. The body frame 10 supports a battery for powering the electric motors 84 and 96 and the electronic units although not shown in the drawings.

When the two electric motors 84 for the drive disks 70 are rotated in the same direction at a same speed, the vehicle travels in the fore and aft direction owing to the rotation of the main wheel 30 around the laterally extending rotational center line B thereof. At such a time, the driven rollers 60 on the main wheel 30 remain stationary in regard to the rotation thereof around the respective tangential lines.

When the two electric motors 84 for the drive disks 70 are rotated at a different speed or in different directions, the vehicle travels in an oblique direction owing to the lateral component of the drive force created by the rotation of the driven rollers 60 on the main wheel 30 which is in turn caused by the engagement between the drive rollers 78 and the driven rollers 60. When the rotational speeds of the electric motors 84 are the same but in the opposite directions, the vehicle is enabled to travel in the lateral direction owing to the rotation of the driven rollers 60 while the main wheel 30 remains stationary in regards to the rotation about the lateral axial line thereof.

Thus, by suitably actuating the electric motors 84 for the drive disks 70, the vehicle is able to travel linearly in any desired direction.

When the tail wheel 94 is rotatively actuated by the electric motor 96, the vehicle is caused to turn around a vertical line passing through the road contact point of the main wheel 30. In other words, any desired yaw movement of the vehicle may be achieved by suitably actuating the electric motor 96 for the tail wheel 94. Thus, by combining the control of the movement of the main wheel 30 and the control of the movement of the tail wheel 94, the vehicle is able to change both the travel direction and the heading of the vehicle at will.

As discussed earlier, in the frictional propulsion device of the illustrated embodiment, because the drive side contact circle D1 of the drive disks 70 is smaller than the driven side contact circle D2 of the main wheel 30, if the circumferential pitch of the drive rollers 78 is fixed, the number of the drive rollers 78 can be significantly reduced as compared to the case where D1=D2. In particular, the smaller the drive side contact circle D1 is, the fewer the number of drive rollers 78 is.

Because the drive disks 70 are offset relative to the main wheel 30 such that the only those drive rollers 78 located in the proximity of the driven rollers 60 are in contact with the driven rollers 60, only those driven rollers contacting the road surface are frictionally driven by the drive rollers 78 while the driven rollers 60 not contacting the road surface are not needlessly actuated by the drive rollers 78. Therefore, power loss is minimized, and the power efficiency of the frictional propulsion device can be improved.

Because the central axial line A of the support shaft 22 and the central axial line B of the main wheel 30 are in parallel to each other, and the imaginary planes containing the drive side contact circle and the driven side contact circle are both in parallel with the vertical plane, the lateral expanse of the two drive disks 70 is minimized so that the lateral dimension of the frictional propulsion device is reduced as compared to the case where the imaginary plan containing the drive side contact circle is tilted with respect to the vertical plane. Because the imaginary plane containing the drive side contact circle is perpendicular to the central axial line A of the support shaft 22, the electric motors 84 for driving the drive disks 70 can also be positioned horizontally, thereby eliminating the need for any special arrangement for mounting the electric motors 84 on the body frame 10.

Although the present invention has been described in terms of preferred embodiments thereof, it is obvious to a person skilled in the art that various alterations and modifications are possible without departing from the scope of the present invention.

For instance, the arm 106 may extend from the support shaft 22 only in one direction, and may be provided with the free rollers 110 at the free end thereof that engage the inner peripheral part of the main wheel 30 optionally under a spring force. The arm is not necessarily required to be supported by the support shaft 22, but may also be supported by the body frame 10.

Figure 6:
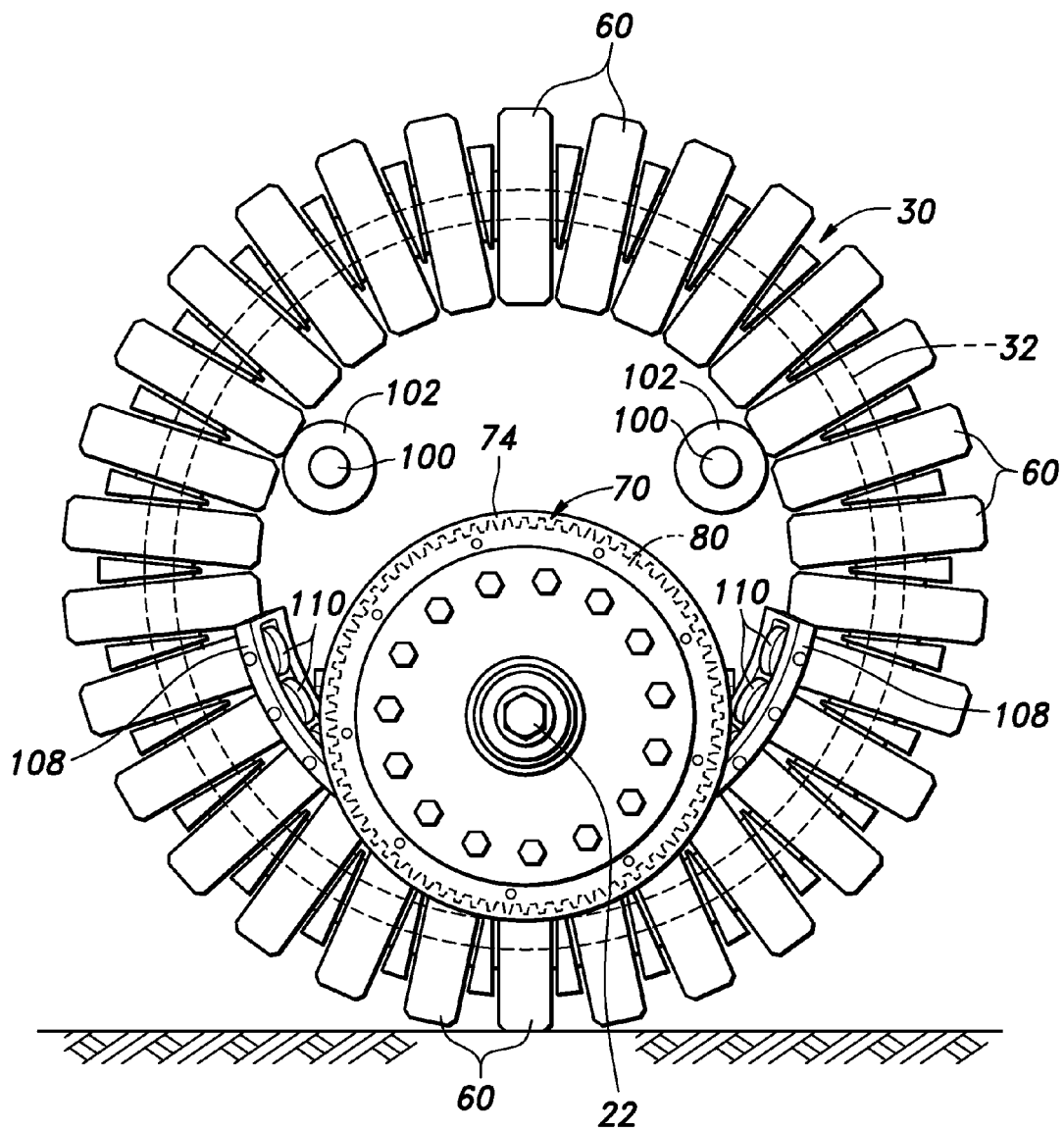
FIG. 6 is a view similar to FIG. 2 showing an alternate embodiment of the drive disk assembly.

Also, as shown in FIG. 6, a plurality of idler rollers 102 may be provided along the circumferential direction of the main wheel 30. In this case, in addition to preventing the roll movement of the main wheel 30 relative to the body frame 10, the idler rollers 102 perform the function of preventing the yaw movement of the main wheel 30 relative to the body frame 10. The idler rollers 102 may also consist of simple cylindrical members, instead of hourglass shaped members. The idler rollers 102 may also consist of sliders for preventing the roll and yaw movements of the main wheel 30, instead of free rollers.

The invention claimed is:

1. A frictional propulsion device, comprising:
a frame;
a main wheel including an annular core member having a laterally extending central axial center line and a plurality of driven rollers each rotatably supported on the annular core member about a tangential line of the annular core member;
a support shaft supported by the frame and extending laterally across a hollow interior of the main wheel;
a pair of drive disks rotatably supported by the support shaft on either side of the main wheel, the drive disks being individually rotatable around a central axial line common to the support shaft; and
a plurality of drive rollers arranged along a peripheral part of each drive disk and each rotatably supported by the drive disk about a rotational center line at an angle with respect to both a tangential line of the drive disk and the rotational center line of the drive disk, at least part of the drive rollers engaging the driven rollers of the main wheel;
wherein a diameter of a drive side contact circle defined by points on the drive disk at which the drive rollers contact the driven rollers is smaller than a diameter of a driven side contact circle defined by the points on the main wheel at which the driven rollers contact the drive rollers, and the drive disks are vertically offset relative to the main wheel so that only those drive rollers adjoining the main wheel are in contact with the driven rollers.

2. The frictional propulsion device according to claim 1, wherein the central axial line of the support shaft and a central axial line of the main wheel are parallel to each other, and imaginary planes containing the drive side contact circle and the driven side contact circle are parallel to each other.

3. The frictional propulsion device according to claim 1, further comprising a guide member supported by the frame for engaging the driven rollers that are not in contact with the drive rollers against yaw and/or roll movement of the main wheel relative to the frame.

4. The frictional propulsion device according to claim 3, wherein the guide member includes a plurality of guide members that engage the driven rollers located in a plurality of circumferentially separated parts of the main wheel.

5. The frictional propulsion device according to claim 3, wherein the guide member includes a plurality of free rollers each configured to make a rolling contact with the driven rollers on the main wheel.

6. The frictional propulsion device according to claim 3, wherein the guide member includes an hourglass shaped roller having a central axial line in parallel with a central axial line of the main wheel and engaging an inner peripheral part of the main wheel.

7. The frictional propulsion device according to claim 3, wherein the guide member includes at least a pair of rollers each having a central axial line in parallel with a central axial line of the main wheel and engaging an inner peripheral part of the main wheel.

8. The frictional propulsion device according to claim 3, wherein the guide member includes an arm rotatably supported by the support shaft or the frame around the central axial line of the support shaft and at least one free roller supported by the arm and making a rolling contact with the driven rollers on the main wheel.

9. The frictional propulsion device according to claim 8, wherein the arm extends away from the central axial line of the support shaft in two opposite directions, and the at least one free roller is provided on each terminal end of the arm.

10. An omni-directional vehicle, comprising:
   the frictional propulsion device according to claim 1; and
   a drive unit supported by the frame and configured to rotationally drive the two drive disks individually.

\* \* \* \* \*